United States Patent
Smith

(10) Patent No.: US 7,671,743 B2
(45) Date of Patent: *Mar. 2, 2010

(54) DETECTING A DEPARTURE OF AN RFID TAG FROM AN AREA

(75) Inventor: Donnie A. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 554 days.

This patent is subject to a terminal disclaimer.

(21) Appl. No.: 11/556,435

(22) Filed: Nov. 3, 2006

(65) Prior Publication Data

US 2008/0106411 A1    May 8, 2008

(51) Int. Cl.
*G08B 13/14* (2006.01)

(52) U.S. Cl. .................. 340/572.1; 340/10.1; 340/505

(58) Field of Classification Search .............. 340/505
See application file for complete search history.

(56) References Cited

U.S. PATENT DOCUMENTS

| | | | | |
|---|---|---|---|---|
| 5,963,134 | A * | 10/1999 | Bowers et al. ........... | 340/572.1 |
| 6,195,006 | B1 * | 2/2001 | Bowers et al. ........... | 340/572.1 |
| 6,708,879 | B2 * | 3/2004 | Hunt ...................... | 235/385 |
| 6,774,782 | B2 * | 8/2004 | Runyon et al. ............. | 340/505 |
| 6,967,577 | B2 | 11/2005 | Taylor et al. | |
| 7,002,473 | B2 * | 2/2006 | Glick et al. ............. | 340/572.1 |
| 7,034,684 | B2 | 4/2006 | Boman et al. | |
| 7,176,797 | B2 * | 2/2007 | Zai et al. ................. | 340/572.1 |
| 7,239,241 | B2 * | 7/2007 | Claudatos et al. ........ | 340/572.1 |
| 7,245,221 | B2 * | 7/2007 | Claudatos et al. ........ | 340/572.1 |
| 7,394,372 | B2 * | 7/2008 | Gloekler et al. .......... | 340/572.1 |
| 7,403,108 | B2 * | 7/2008 | Aljadeff et al. ............ | 340/500 |
| 2002/0116274 | A1 | 8/2002 | Hind et al. | |
| 2004/0111335 | A1 | 6/2004 | Black et al. | |
| 2005/0040950 | A1 | 2/2005 | Clucas | |
| 2005/0134459 | A1 * | 6/2005 | Glick et al. .............. | 340/572.1 |
| 2005/0237194 | A1 | 10/2005 | VoBa | |
| 2005/0258955 | A1 * | 11/2005 | Gloekler et al. ......... | 340/539.13 |
| 2005/0262751 | A1 | 12/2005 | Leslie | |
| 2006/0015739 | A1 | 1/2006 | Suzuki | |
| 2006/0022823 | A1 * | 2/2006 | Ryal ........................ | 340/572.1 |
| 2008/0106411 | A1 * | 5/2008 | Smith ....................... | 340/572.1 |
| 2009/0009334 | A1 * | 1/2009 | Smith, Jr. ................. | 340/572.4 |

\* cited by examiner

*Primary Examiner*—Travis R Hunnings
(74) *Attorney, Agent, or Firm*—Cuenot, Forsythe & Kim, LLC

(57) ABSTRACT

A method of determining whether a radio frequency identifier (RFID) tag has been removed from an area can include, responsive to detecting an RFID tag in a first area, making an entry within a tag read cache associated with the first area. The entry within the tag read cache can include an identifier corresponding to the RFID tag and a timestamp indicating when the RFID tag was detected in the first area. A difference between a current time and the timestamp from the entry within the tag read cache can be calculated. An indication that the RFID tag is no longer in the first area can be provided if the difference exceeds a departure threshold.

17 Claims, 3 Drawing Sheets

DETECTING A DEPARTURE OF AN RFID TAG FROM AN AREA

BACKGROUND OF THE INVENTION

Radio frequency identification (RFID) is a well known technology that has been utilized in many different industries, i.e., the shipping industry to track packages, the retail industry to prevent thefts, etc. RFID technology uses electromagnetic energy as a medium for transmitting information between an RFID reader and a type of a circuit referred to as an RFID tag. In general, the RFID reader can detect and read data, i.e., a tag identifier (tag ID), that is stored within the RFID tag.

RFID tags can be either passive or active. Passive tags do not have a separate power source and often use modulated backscatter to reflect energy back to the RFID reader. Other types of passive tags may discharge a capacitor that was charged using the RF energy from the RFID reader's interrogation signal, or ping. Active tags, on the other hand, have power sources that enable the tag to send data back to the reader. Active RFID tags typically can send data over a larger range than their passive RFID counterparts. Both varieties of RFID tags provide for non-contact and non-line of sight sensing.

When an RFID reader reads or detects an RFID tag, the RFID reader emits an RF signal. RFID tags within the RF field respond by transmitting the tag ID to the RFID reader. The RFID reader can provide the tag ID to one or more different computer systems that are coupled to the RFID reader. The computer systems can implement various processes based upon the tag ID received.

BRIEF SUMMARY OF THE INVENTION

The present invention is directed to determining locations of radio frequency identification (RFID) tags and when such RFID tags are no longer present within a specified area or location. One embodiment of the present invention can include a method of determining whether an RFID tag has been removed from an area. The method can include, responsive to detecting an RFID tag in a first area, making an entry within a tag read cache associated with the first area, wherein the entry within the tag read cache comprises an identifier obtained from the RFID tag and a timestamp indicating when the RFID tag was detected in the first area. A difference between a current time and the timestamp from the entry within the tag read cache can be calculated. An indication can be provided that the RFID tag is no longer in the first area if the difference exceeds a departure threshold. If the difference exceeds the departure threshold, the entry in the tag read cache corresponding to the RFID tag can be purged.

Another embodiment of the present invention can include a method of determining whether an RFID tag has been moved from one area to another. The method can include, for each of a plurality of detected RFID tags, making a location cache entry comprising a location identifier specifying an area in which the RFID tag was detected, and making a tag read cache entry corresponding to the location cache entry, wherein the tag read cache entry comprises a tag identifier of the RFID tag and a timestamp indicating when the RFID tag was read in the area. Tag read cache entries having an age that exceeds a departure threshold as determined by a comparison of the timestamp specified by the tag read cache entries with a current time can be identified. For each identified tag read cache entry, a notification that the RFID tag associated with that tag read cache entry is no longer in the area specified by the location cache entry which corresponds to the tag read cache entry can be provided. For each identified tag read cache entry, the identified tag read cache entry and the corresponding location cache entry can be purged.

Yet another embodiment of the present invention can include a computer program product comprising a computer-readable medium having code that, when executed by an information processing system, causes the system to perform the various steps, methods, and/or functions described herein.

DETAILED DESCRIPTION OF THE INVENTION

Figure 1:
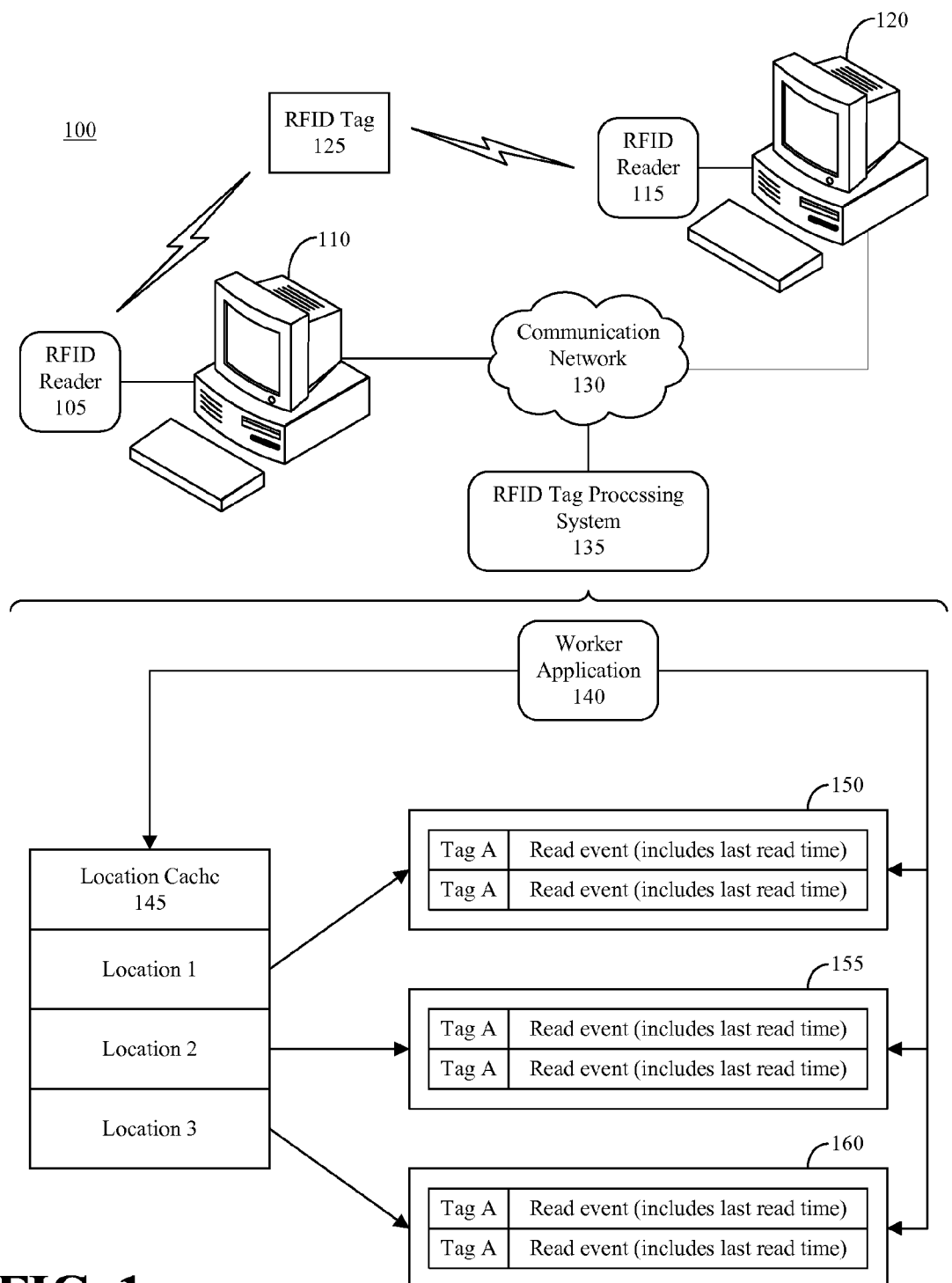
FIG. 1 is a block diagram illustrating a system in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. The medium can be, for example, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk —read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is directed to determining whether a radio frequency identifier (RFID) tag has been removed from, or is no longer within, an area. As RFID tags are detected, data relating to the detection of the RFID tag can be stored within one or more cache memories. That stored data can indicate the tag identifier (tag ID) of the detected RFID tag as well as location and time information pertaining to the detection of the RFID tag in a specified area or location. As RFID tags are continually detected within a same area, the timing information stored within the cache can be updated to reflect the most recent time that the RFID tag was detected in the area. RFID tags having cache entries that are older than a predetermined threshold, as compared to the current time, can be considered to have been removed from the area. Further aspects of the present invention will be described herein with reference to the drawings.

FIG. 1 is a block diagram illustrating a system 100 in accordance with one aspect of the present invention. The system 100 can include one or more RFID readers 105 and 115, with each being coupled to a respective data processing system, i.e., computers 110 and 120 respectively. The RFID readers 105 and 115 can read and/or detect RFID tags such as RFID tag 125. It should be appreciated that the manner in which the RFID readers 105 and 115 are linked with computers 110 and 120 is not intended to limit the present invention. For example, the RFID readers 105 and 115 can be linked with the computers 110 and 120 as standard peripheral devices, can be integrated directly into, or within, the computers 110 and 120, or can be connected via wireless communication links, such as through a Bluetooth connection or other short-range wireless communication link.

The RFID tag 125 can be attached to, or carried upon, a physical object (not shown). For example, the RFID tag 125 can be attached to an item that is for sale, an object or package being shipped, or can be carried by a human being. In one embodiment, the RFID tag 125 can be an active tag with an internal power source. In that case, the RFID tag 125 can emit an RF signal that can be detected by either RFID reader 105 or 115 when in range. The RFID readers 105 and 115 can process received RF signals from the RFID tag 125 to accurately determine unique identifying information imprinted or programmed into the RFID tag 125, i.e., a tag ID or the like.

In another embodiment, the RFID tag 125 can be a passive device that can be interrogated by an RF field emitted by the RFID readers 105 and 115. When interrogated, the RFID tag 125 can become active. The RFID tag 125 can detect the presence of the field of either or both of the RFID readers 105 and 115 and subsequently activate to send data. Like its active RFID tag counterpart, a passive RFID tag can communicate with the RFID readers via wireless RF communication links that are not limited to line of sight operation.

The computers 110 and 120 can be communicatively linked, along with an RFID Tag Processing System (RTPS) 135, via a communication network 130. The communication network 130 can be implemented as, or include, without limitation, a WAN, a LAN, the Public Switched Telephone Network (PSTN), the Web, the Internet, and one or more intranets. The communication network 130 further can include one or more wireless networks, whether short or long range. For example, in terms of short range wireless networks, the communication network 130 can include a local wireless network built using a Bluetooth or one of the IEEE 802 wireless communication protocols, i.e., 802.11a/b/g/i, 802.15, 802.16, 802.20, Wi-Fi Protected Access (WPA), or WPA2. In terms of long range wireless networks, the communication network 135 can include a mobile, cellular, and/or satellite-based wireless network and support voice, video, text, and/or any combination thereof, i.e., a GSM, TDMA, CDMA, and/or WCDMA network.

The RTPS 135 can be implemented as an application executing within a data processing system. The RTPS 135 can include a worker application 140 as well as a location cache 145 and a tag read cache 150. The location cache 145 can include entries specifying locations within which RFID tags have been detected. A tag read cache can be associated with each location specified in the location cache 145. For example, tag read cache 150 can be associated with location 1, tag read cache 155 can be associated with location 2, and tag read cache 160 can be associated with location 3.

Each of the tag read caches 150, 155, and 160, can include one or more entries, with each entry specifying a particular RFID tag that was detected in the location associated with that tag read cache. The entries, for example, can specify the tag ID read from an RFID tag as well as corresponding event data. The event data can include, but is not limited to, timestamp information which can specify a date and/or time at which the RFID tag specifying the tag ID was detected. In one embodiment, entries in the tag read cache 150 can be stored as key value pairs, where the tag ID is the key and the value is the event data. In any case, the timestamp information can indicate the most recent read time for the RFID tag in that area. Thus, tag read cache 150 specifies a list of tags detected in location 1. The timing information indicates the most recent time that each respective RFID tag, i.e., RFID tag A and B, was read or detected in location 1.

The worker application 140 can process the entries of the location cache 145 and the tag read cache(s) 150, 155, and 160 to determine which, if any, RFID tags are no longer within a given area or at a particular location. In one aspect, the term "area" or "location" can refer to the geographic area surrounding an RFID reader in which an RFID tag will be detected by that RFID reader. An "area" or "location" also can be defined as a room in a building, or another geographic subdivision according to where the RFID reader is placed. For example, RFID reader 105 can correspond to "location 1" while RFID reader 115 can correspond to "location 2".

In operation, as RFID tag 125 is moved about an area, or from one area to another, the RFID tag 125 can be read by an RFID reader, i.e., RFID reader 105 or 115. The RFID readers 105 and 115 can continuously, repeatedly, or periodically, scan for RFID tags in their respective areas. Upon detection, the RFID reader, for example, RFID reader 105, can notify the computer 110 attached thereto. Each time that the RFID tag 125 is detected by the RFID reader 105, information, i.e., an event, can be provided to the computer 110.

The computer 110 can include suitable program code causing the computer 110 to provide a notification to the RTPS 135 responsive to the detection of the RFID tag 125. The notification can specify the tag ID and the timestamp information. For example, the tag ID can be provided by the RFID reader 105, as read from the RFID tag 125 as part of the read event from the RFID reader. The timestamp information can be determined by the computer 110 and added to the notification responsive to receiving the read event from the RFID reader 105.

In one aspect, the computer 110 can provide an area identifier to the RTPS 135. In another aspect, the RTPS 135 can be pre-programmed with knowledge of where particular RFID readers and/or computers are located, such that upon receiving a notification from the computer 110 and/or RFID reader 105, the RTPS 135 can determine the area in which the RFID tag 125 was detected. Further detail regarding the processing and management of the location cache 145 and the various tag read cache(s) 150-160 will be described with reference to FIGS. 2 and 3.

Figure 2:
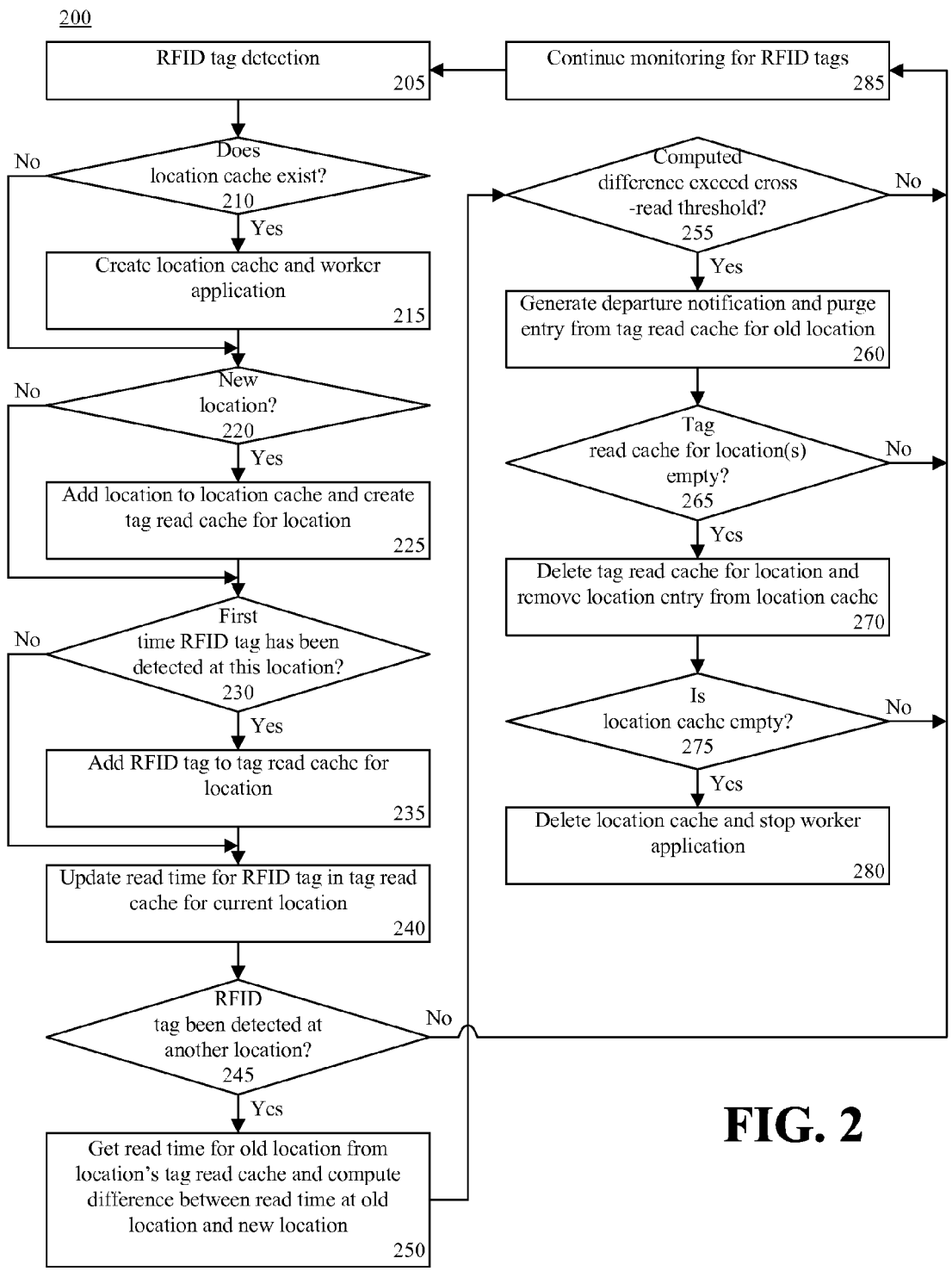
FIG. 2 is a flow chart illustrating one aspect of a method of determining whether a radio frequency identifier (RFID) tag has been removed from an area.

FIG. 2 is a flow chart illustrating a method 200 of determining whether an RFID tag has been removed from an area and/or relocated to another area in accordance with another aspect of the present invention. The method 200 can be implemented using a system such as the system described with reference to FIG. 1. Accordingly, in step 205, the system can begin operating and can detect an RFID tag, i.e., RFID tag A.

In step 210, a determination can be made as to whether the location cache exists. If so, the method can proceed to step 215. If not, the method can continue to step 220. In step 215, the location cache can be created. Further the RTPS can create and/or instantiate the worker application.

In step 220, a determination can be made as to whether the location corresponding to the detected RFID tag A, referred to as location 1, is a new location. For example, if no entry exists within the location cache corresponding to location 1, the location can be considered a new location. If location 1 is already specified within the location cache as an entry, the location is not a new location. If the location is new, the method can proceed to step 225. Otherwise, the method can proceed to step 230. In step 225, the location corresponding to the detected RFID tag, i.e., location 1, can be added to the location cache. Further, a tag read cache corresponding to that location can be created.

In step 230, a determination can be made as to whether the detection of the RFID tag in the current location is the first time that the RFID tag was detected in that location. Whether this detection is the first time the RFID tag has been detected at the current location can be determined by reviewing the tag read cache associated with the current location. For example, if an entry exists for RFID tag A in the tag read cache corresponding to location 1, then RFID tag A has already been detected at location 1. If an entry for RFID tag A does not exist, then this occurrence is the first time RFID tag A has been detected at location 1. If this is the first time the RFID tag has been detected at this location, the method can proceed to step 235. Otherwise, the method can continue to step 240.

In step 235, the RFID tag can be added to the tag read cache that corresponds to the current location. The entry can specify the tag ID corresponding to the RFID tag. In step 240, the read time for the RFID tag added to the tag read cache for the current location can be written or updated. For example, the entry corresponding to RFID tag A in the tag read cache corresponding to location 1 can be updated with timestamp information indicating this most recent read of the RFID tag A.

In step 245, a determination can be made as to whether the RFID tag was detected at another location. For example, each of the tag read caches corresponding to the different locations can be searched to determine whether an entry exists for RFID tag A. If an entry exists for RFID tag A in one or more other tag read caches, then RFID tag A is determined to have been located in the locations corresponding to the tag read caches having such an entry. These locations can be considered "older" as compared to the current location, i.e., location 1. If the RFID tag is detected at another location, the method can proceed to step 250. If not, the method can continue to step 285.

In step 250, the timestamp information for the older location as determined from the entry for the RFID tag in the tag read cache associated with the older location can be obtained or read. This timestamp information, which specifies the timestamp of the most recent read of the RFID tag at the older location, can be compared with the timestamp information for the same RFID tag, i.e., RFID tag A, in the tag read cache for the current location, i.e., location 1. A difference between the timestamp specified by the entry for RFID tag A for location 1 and the timestamp specified by the entry for RFID tag A in the tag read cache corresponding to the older location can be computed.

In step 255, a determination can be made as to whether the difference exceeds a predetermined cross-read threshold. If so, system can determine that RFID tag A is no longer in the older location and the method can proceed to step 260. If not, the system can determine that RFID tag A may still be in the older location and the method can continue to step 285. In step 260, a departure notification can be generated indicating that the RFID tag, i.e., RFID tag A, is no longer at the older location. The departure notification can be provided to another system that may be in communication with the system of FIG. 1, another application, displayed upon a display screen, or the like. Further, the departure notification also can indicate that the RFID tag is now located in the new location, i.e., that RFID tag A is now located at location 1.

In step 265, a determination can be made as to whether any of the tag read cache(s) are empty. If so, the method can proceed to step 270, where each empty tag read cache can be deleted. Further, the entry for the location in the location cache that corresponds to each deleted tag read cache can be deleted from the location cache. If no tag read caches are empty, the method can continue to step 285.

In step 275, a determination can be made as to whether the location cache is empty. If so, the method can proceed to step 280 where the location cache can be deleted and the worker application can be stopped. If the location cache is not empty, the method can proceed to step 285. In step 285, the system can continue monitoring for RFID tags until such time as one is detected or the system is stopped.

Figure 3:
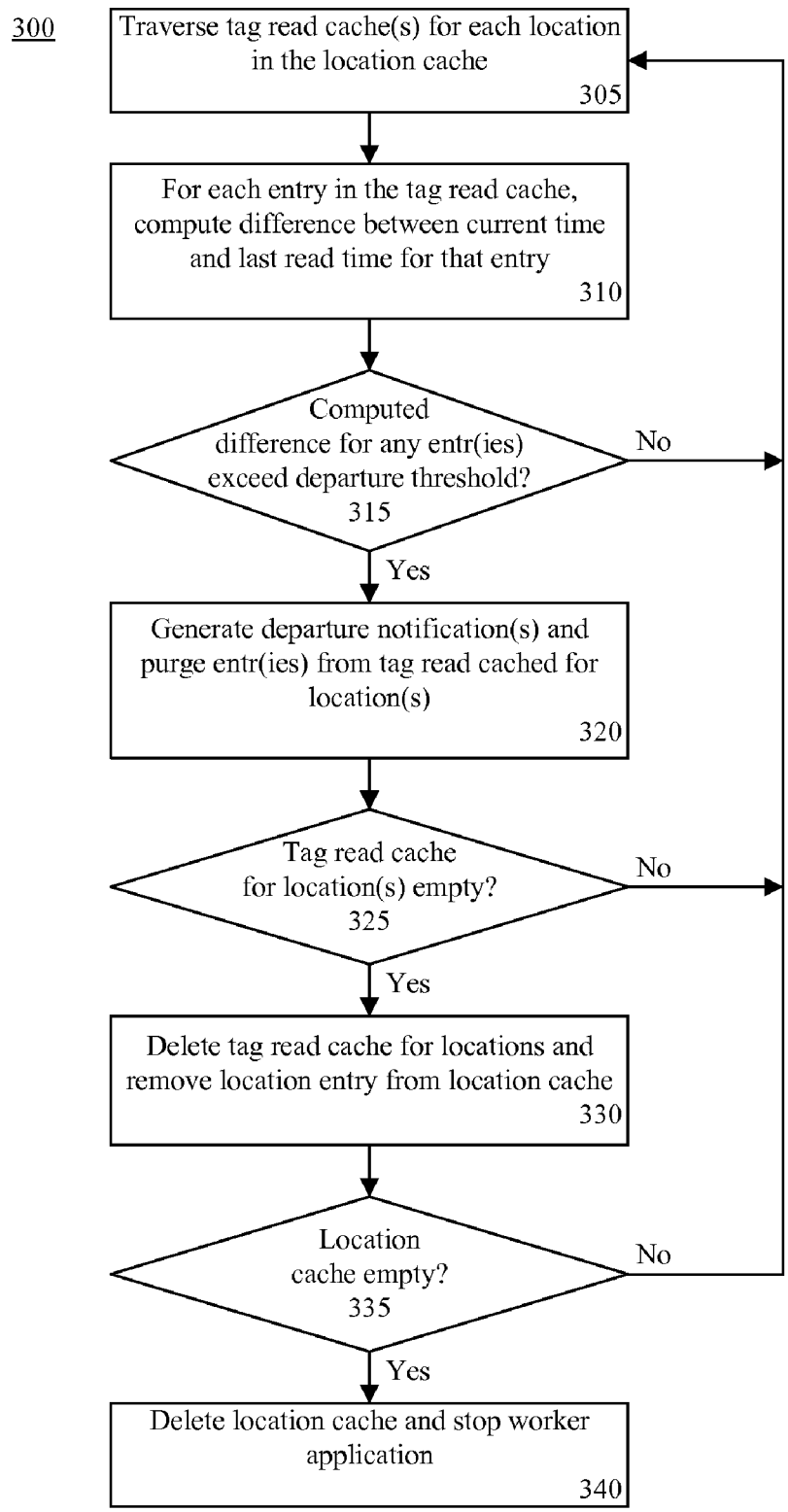
FIG. 3 is a flow chart illustrating another aspect of a method of determining whether an RFID tag has been removed from an area.

FIG. 3 is a flow chart illustrating a method of determining whether an RFID tag has been removed from an area and/or relocated to another area in accordance with another aspect of the present invention. The method 300 can be performed by the system illustrated with reference to FIG. 1. Further, the method of FIG. 2 and the method of FIG. 3 can be performed in parallel or concurrently by the system to identify RFID tags that have left a designated area or location and/or been relocated or moved to another area.

Accordingly, the method 300 can begin in step 305 where the tag read cache(s) for each location specified in the location cache can be read. In step 310, for each entry in the tag read cache(s), the difference between the timestamp, which specifies the most recent read time for a given RFID tag at a particular location, and the current time can be computed.

In step 315, a determination can be made as to whether the difference computed in step 310 for any entries exceeds a predetermined departure threshold. If so, the system can determine that the RFID tag of each such entry is no longer located at the location corresponding to the tag read cache within which the entry is located and the method can continue to step 320. If no difference computed in step 310 exceeds the departure threshold, the method can loop back to step 305 to continue processing.

In step 320, a departure notification for each entry of the tag read cache(s) that has been determined to exceed the departure threshold in step 315 can be generated. For example, if an entry in the tag read cache corresponding to location 1 for RFID tag A has been determined to exceed the departure threshold, a departure notification can be generated that indicates that RFID tag A is no longer located in location 1. As noted, the departure notification can be provided to another system or displayed for viewing by a user, or the like.

In step 325, a determination can be made as to whether any of the tag read cache(s) are empty. If so, the method can proceed to step 330, where each empty tag read cache can be deleted. Further, the entry for the location in the location cache that corresponds to each deleted tag read cache can be deleted from the location cache. If no tag read caches are empty, the method can loop back to step 305.

In step 335, a determination can be made as to whether the location cache is empty. If so, the method can proceed to step 335 where the location cache can be deleted and the worker application can be stopped. If the location cache is not empty, the method can loop back to step 305 to continue processing.

The arrangements disclosed herein relate to the determination of when an RFID tag has left or been removed from a particular location or area. The embodiments disclosed herein provide an RFID tag departure event for a specific RFID tag from a specific location when there are no new read events for that RFID tag at that location. The tag read events can be cached or stored on a per location basis and updated to indicate the most recent read time for the RFID tag in a specified location. As the most recent read time ages, the RFID tag can be determined to have been removed from a particular location or area.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of determining whether a radio frequency identifier (RFID) tag has been removed from an area comprising:
    responsive to detecting an RFID tag in a first area, making an entry within a tag read cache associated with the first area, wherein the entry within the tag read cache comprises an identifier corresponding to the RFID tag and a timestamp indicating when the RFID tag was detected in the first area;
    calculating a difference between a current time and the timestamp from the entry within the tag read cache;
    indicating that the RFID tag is no longer in the first area if the difference exceeds a departure threshold; and
    if the difference exceeds the departure threshold, purging the entry in the tag read cache corresponding to the RFID tag.

2. The method of claim 1, farther comprising updating the timestamp of the entry within the tag read cache for the RFID tag responsive to a subsequent detection of the RFID tag in the first area.

3. The method of claim 1, wherein making an entry farther comprises making an entry within a location cache comprising an area indication specifying the first area, wherein the entry within the location cache is associated with the tag read cache.

4. The method of claim 3, further comprising, responsive to detecting the RFID tag in a second area, making an entry within the location cache comprising an area indication specifying the second area and making an entry within a different tag read cache associated with the second area comprising the identifier corresponding to the RFID tag and a timestamp indicating when the RFID tag was detected within the second area.

5. The method of claim 4, further comprising:
    calculating a difference between the timestamp indicating when the RFID tag was detected in the second area and the timestamp indicating when the RFID tag was detected in the first area; and
    if the difference exceeds a cross-read threshold, indicating that the RFID tag is no longer in the first area.

6. The method of claim 5, further comprising purging the entry in the location cache for the RFID tag corresponding to the first area and purging the entry in the tag read cache for the RFID tag corresponding to the first area.

7. A method of determining whether a radio frequency identifier (RFID) tag has been moved from an area, the method comprising:
    for each of a plurality of detected RFID tags,
        making a location cache entry comprising a location identifier specifying an area in which the RFID tag was detected;
        making a tag read cache entry in a tag read cache corresponding to the location cache entry, wherein the tag read cache entry comprises a tag identifier corresponding to the RFID tag and a timestamp indicating when the RFID tag was read in the area;
    identifying tag read cache entries having an age that exceeds a departure threshold as determined by a comparison of the timestamp specified by the tag read cache entries with a current time;
    for each identified tag read cache entry, providing a notification that the RFID tag associated with that tag read cache entry is no longer in the area specified by the location cache entry which corresponds to the identified tag read cache entry; and
    for each identified tag read cache entry, purging the identified tag read cache entry and purging the corresponding location cache entry.

8. The method of claim 7, further comprising, for each RFID tag that has a location cache entry for at least two different areas,
    calculating a difference between a timestamp indicating when the RFID tag was detected in a second area and a timestamp indicating when the RFID tag was detected in a first area; and
    if the difference exceeds a cross-read threshold, indicating that the RFID tag is no longer in the first area.

9. The method of claim 8, further comprising purging the location cache entry corresponding to the RFID tag for the first area and purging the tag read cache entry for the RFID tag for the first area.

10. The method of claim 7, further comprising, responsive to a detection of an RFID tag in a same area as a prior detection of the RFID tag, updating the timestamp specified in the tag read cache entry for the RFID tag with a timestamp of the latest detection in the same area.

11. The method of claim 7, further comprising, responsive to a detection of an RFID tag in a different area as a prior detection of the RFID tag, making a location cache entry for the RFID tag indicating the different area and making a tag read cache entry within a tag read cache corresponding to the different area for the RFID tag.

12. A computer program product comprising:
    a computer-usable medium having a computer-readable program that determines whether a radio frequency identifier (RFID) tag has been removed from an area, said computer program product including:
    computer-usable program code that, responsive to detecting an RFID tag in a first area, makes an entry within a tag read cache associated with the first area, wherein the entry within the tag read cache comprises an identifier corresponding to the RFID tag and a timestamp indicating when the RFID tag was detected in the first area;
    computer-usable program code that calculates a difference between a current time and the timestamp from the entry within the tag read cache;
    computer-usable program code that indicates that the RFID tag is no longer in the first area if the difference exceeds a departure threshold; and
    computer-usable program code that purges the entry in the tag read cache corresponding to the RFID tag if the difference exceeds the departure threshold.

13. The computer program product of claim 12, further comprising computer-usable program code that updates the timestamp of the entry within the tag read cache for the RFID tag responsive to a subsequent detection of the RFID tag in the first area.

14. The computer program product of claim 12, wherein the computer-usable program code that makes an entry farther comprises computer-usable program code that makes an entry within a location cache comprising an area indication specifying the first area, wherein the entry within the location cache is associated with the tag read cache.

15. The computer program product of claim 14, further comprising computer-usable program code that, responsive to detecting the RFID tag in a second area, makes an entry within the location cache comprising an area indication specifying the second area and makes an entry within a different tag read cache associated with the second area comprising the tag identifier and a timestamp indicating when the RFID tag was detected within the second area.

16. The computer program product of claim 15, further comprising:
   computer-usable program code that calculates a difference between the timestamp indicating when the RFID tag was detected in the second area and the timestamp indicating when the RFID tag was detected in the first area; and
   computer-usable program code that, if the difference exceeds a cross-read threshold, indicates that the RFID tag is no longer in the first area.

17. The computer program product of claim 16, further comprising computer-usable program code that purges the entry in the location cache for the RFID tag corresponding to the first area and purges the entry in the tag read cache for the RFID tag corresponding to the first area.

* * * * *